UNITED STATES PATENT OFFICE.

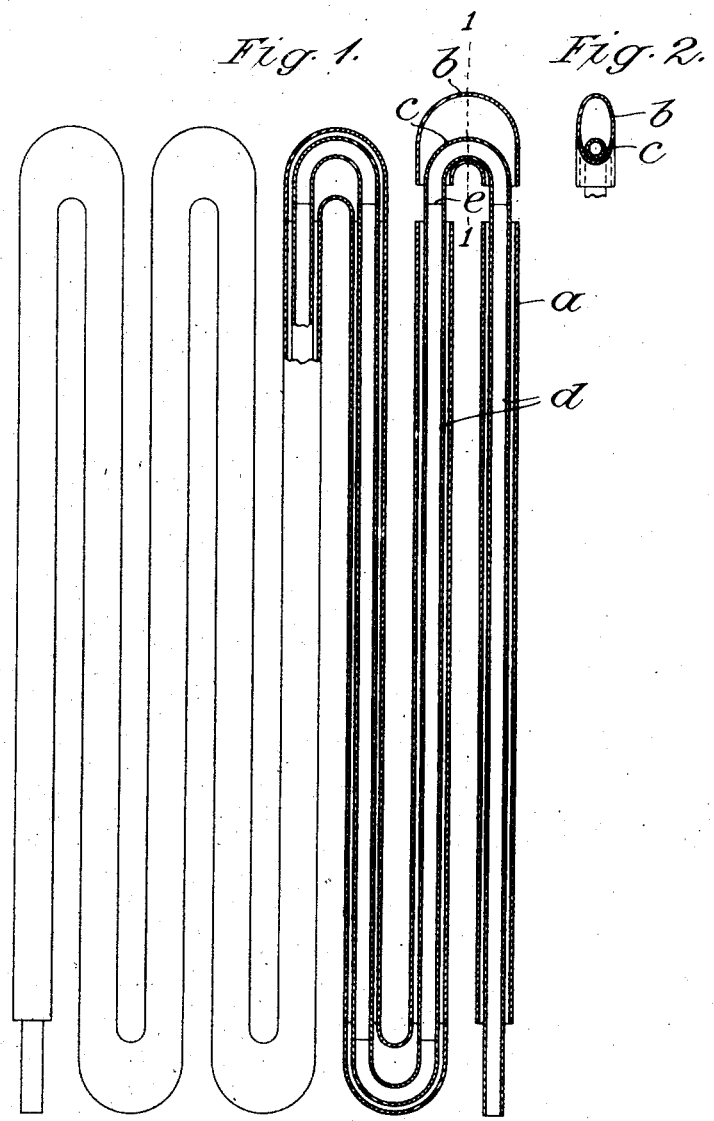

CARL SENSSENBRENNER, OF OBERCASSEL, NEAR DUSSELDORF, GERMANY.

CONCENTRIC-PIPE COIL.

No. 879,201.  Specification of Letters Patent.  Patented Feb. 18, 1908.

Application filed November 23, 1905. Serial No. 289,512.

*To all whom it may concern:*

Be it known that I, CARL SENSSENBRENNER, manufacturer, a subject of Baden, Grand Dukedom, Germany, residing at Obercassel, near Dusseldorf, German Empire, have invented new and useful Improvements in Concentric-Pipe Coils, of which the following is a specification.

My invention has reference to return-bend coils having concentric pipes, and relates in particular to an improved manner of joining the piping at the bends.

In the construction of return-bend coils of concentric pipes, the general practice is to employ connecting-caps, which screw on to the pipes, or are welded on, or are connected by special stuffing-boxes. The objection to such methods of connection is that the outer pipe then presents a number of projecting members, which prove disturbing in use.

According to my invention I employ a bend conveniently welded to the outer pipe, so that the completed coil presents a thoroughly smooth surface throughout.

My invention is illustrated in the accompanying drawing, in which

Figure 1 is an elevation and part section of a flat return-bend coil of concentric pipes, and Fig. 2 a cross section taken through the line 1—1 of Fig. 1.

The junction-piece $b$ of the outer coil $a$ is, at the actual bend, of oval cross section, of greater width than the external cross section of the inner pipe $d\ e$. Before welding the straight lengths $a\ d$ to the bends $b\ c$, the bends $c$ of the inner coil are threaded through the oval sectioned bends $b$ of the outer coil. The bend $c$ of the inner coil can then be welded on in the usual manner, since the outer bend $b$, owing to its oval cross section, can be drawn back so as to expose the places of welding $e$ of the inner pipe.

After the welded joints of the inner coil have been inspected, the outer bends $b$ can be pushed up to the ends of the outer straight sections $a$ and welded to them.

Any differences in the circumference of the ends to be joined can be remedied on welding, so that the finished coil forms a compact whole, the cross section of which changes gradually, without there being any projecting parts.

Instead of the bends $b$ being of oval cross section, any other suitable section may be adopted. In any case, however, the section must be such as to admit of the ends of the inner bends $c$ being sufficiently drawn out; while, on the other hand, it must also allow of the bends $b$ being brought close up against the ends of the outer pipe-sections to which they are to be welded. In this manner inspection or renewal of screw-caps and stuffing-boxes, such as is otherwise necessary, is entirely avoided. The invention is particularly applicable to condensers for liquefying the ammoniacal and carbonic acid vapors generated in the working of ice-making machinery; also to refrigerating apparatus for liquids; to heaters for liquids, when for the purpose of mutual transmission of heat and cold two liquids are conveyed in counter directions; and, further, to feed-heaters in which the water and waste-steam, for the purpose of utilizing the latter, are conducted in opposite directions.

Having thus described my invention, what I claim as new and desire to secure by Letters Patent is:—

1. A return-bend coil, comprising an inner convoluted pipe with welded-on bends, and an outer convoluted pipe containing the same and having welded-on bends of such bore that prior to welding they admit of ample outward play of the inner-pipe bends within them, for the purpose of enabling welding of the latter to the abutting pipe-lengths, substantially as described.

2. A return-bend coil, comprising an inner convoluted pipe with welded-on bends, and an outer convoluted pipe containing the same and having welded-on junction-pieces of oval section at the actual bend, so that prior to welding they admit of ample outward play of the inner pipe bends within them, for the purpose of enabling welding of the latter to the abutting pipe lengths, substantially as described.

In witness whereof I have hereunto signed my name this 13th day of November, 1905, in the presence of two subscribing witnesses.

CARL SENSSENBRENNER.

Witnesses:
 WILHELM HEIHL,
 GUST. KILTZ.